US011986789B1

(12) United States Patent
Fors

(10) Patent No.: US 11,986,789 B1
(45) Date of Patent: May 21, 2024

(54) WINE DECANTER, WINE GLASS AND MOVABLE BASE

(71) Applicant: Michael A. Fors, Sturbridge, MA (US)

(72) Inventor: Michael A. Fors, Sturbridge, MA (US)

( * ) Notice: Subject to any disclaimer, the term of this patent is extended or adjusted under 35 U.S.C. 154(b) by 0 days.

(21) Appl. No.: 18/517,992

(22) Filed: Nov. 22, 2023

(51) Int. Cl.

| | |
|---|---|
| ***B01F 23/23*** | (2022.01) |
| ***B01F 23/232*** | (2022.01) |
| ***B01F 23/2361*** | (2022.01) |
| ***B01F 23/237*** | (2022.01) |
| ***B01F 29/34*** | (2022.01) |
| ***B01F 31/24*** | (2022.01) |
| ***B01F 35/22*** | (2022.01) |
| ***B01F 35/53*** | (2022.01) |
| *A47G 23/02* | (2006.01) |
| *B01F 101/17* | (2022.01) |

(52) U.S. Cl.
CPC .......... *B01F 35/531* (2022.01); *B01F 23/232* (2022.01); *B01F 23/2361* (2022.01); *B01F 23/237611* (2022.01); *B01F 29/34* (2022.01); *B01F 31/24* (2022.01); *B01F 35/2205* (2022.01); *A47G 23/0241* (2013.01); *B01F 2101/17* (2022.01)

(58) Field of Classification Search
CPC ... B01F 35/2205; B01F 23/2361; B01F 29/34
See application file for complete search history.

(56) References Cited

U.S. PATENT DOCUMENTS

| | | | |
|---|---|---|---|
| D70,091 | S | 5/1926 | Bell |
| D72,162 | S | 3/1927 | Loomis |
| D75,674 | S | 7/1928 | Beam |
| D87,932 | S | 10/1932 | Mccartney |
| D99,107 | S | 3/1936 | Bell |
| D110,273 | S | 6/1938 | Cunningham |

(Continued)

FOREIGN PATENT DOCUMENTS

| | | | | |
|---|---|---|---|---|
| NL | 2016070 B1 | | 7/2017 | |
| WO | 2000/041602 A1 | | 7/2000 | |
| WO | WO-2007105075 A1 | * | 9/2007 | ......... A47G 19/2205 |

OTHER PUBLICATIONS

"Esperienze Pinot Noir & Amarone (Set of 2)", accessed Nov. 22, 2023, 2 pages. https://zafferanoamerica.com/products/esperienze-pinot-noir-amarone.

(Continued)

*Primary Examiner* — Robert A Hopkins
(74) *Attorney, Agent, or Firm* — Richard Kosakowski

(57) ABSTRACT

A wine decanter includes a reservoir that holds wine and a neck with an opening to allow wine to enter and exit the reservoir. The reservoir is generally rectangular with opposing front and rear sides and opposing left and right sides, and a substantially flat bottom. Protrusions are located on the reservoir inner surface at one of the front and rear sides or left and right sides. Each protrusion spans an entire length of one of the sides and protrudes into the reservoir thereby aerating the wine as it passes by the protrusions. All protrusions are located above the flat bottom of the reservoir such that none of the protrusions are located on the flat bottom of the reservoir, thereby allowing the wine to pool on the flat bottom of the reservoir. A base is provided that moves the decanter in a controlled back-and-forth motion to aerate the wine.

17 Claims, 6 Drawing Sheets

(56) References Cited

U.S. PATENT DOCUMENTS

| | | | |
|---|---|---|---|
| D121,805 | S | 8/1940 | Cooke |
| D126,837 | S | 4/1941 | Morrison |
| D449,962 | S | 11/2001 | Harrison et al. |
| D489,572 | S | 5/2004 | Bastianich |
| D601,029 | S | 9/2009 | Wagner |
| 7,975,872 | B2 | 7/2011 | Lardino |
| 8,925,757 | B2 | 1/2015 | Baratte |
| D727,670 | S | 4/2015 | Rokos |
| 9,016,930 | B2 | 4/2015 | Cayley et al. |
| D799,903 | S | 10/2017 | Hume |
| 9,873,097 | B1 | 1/2018 | Dushine et al. |
| 10,350,561 | B1 | 7/2019 | Dushine et al. |
| 11,452,977 | B2 | 9/2022 | Shotey et al. |
| 2006/0249518 | A1 | 11/2006 | Festa |
| 2008/0290101 | A1 | 11/2008 | Stecca |
| 2014/0023767 | A1 | 1/2014 | Dikas |
| 2020/0157482 | A1 | 5/2020 | Levin et al. |
| 2020/0229623 | A1 | 7/2020 | Liu |
| 2021/0031155 | A1 | 2/2021 | Hellmers et al. |

OTHER PUBLICATIONS

"Arttodo Electric Wine Decanter Aerator, Aerator Carafe Shaker, Luxury Elegent Wine Gifts Design Electronic Decanter Shaker, Compatible with Wine Glasses Decanter Aerator (Base Only (Red))", accessed Nov. 22, 2023, 6 pages. https://www.amazon.com/Arttodo-Electric-Decanter-ElectronicCompatible/dp/B09BJKL1WY.

"Wake Up Wine Pro S Electric Decanter with BT Audio", accessed Nov. 22, 2023, 2 pages. https://www.williams-sonoma.com/products/wake-up-wine-pro-electricdecanter-bt-audio/?.

Item #3939E Eminence Red Wine Glass, accessed Nov. 22, 2023, 1 page. https://www.imprintitems.com/product/eminence-red-wine-glass.

* cited by examiner

WINE DECANTER, WINE GLASS AND MOVABLE BASE

FIELD OF THE INVENTION

The subject matter disclosed herein relates in general to wine decanters, and more specifically to a wine decanter having protrusions on an inner surface that facilitate rapid aeration of the wine and the resultant rapid development and enhancement of the aromas and flavors of the wine when the decanter is moved either by hand or by a base having a movable (motorized) upper surface on which the decanter is placed.

BACKGROUND OF THE INVENTION

In the art of wine, it is known to expose the wine to air for a period of time to allow the aromas and flavors of the wine to better manifest themselves prior to consumption of the wine. A common device for doing this is a decanter, which may have internal structural features such as protrusions formed on the inner surface of the decanter. These features increase the area of the inner surface of the decanter, which increases the surface area of the wine inside the decanter as the wine flows along the flow paths created by these features. This has the beneficial effect of increasing the amount of contact of the wine with air, thereby increasing the resultant amount of oxygen absorption by the wine.

The decanter having the internal structural features thus exposes a relatively greater amount of surface area of the wine to the atmosphere as compared to if the wine were just left in the typical bottle in which the cork has been removed and the bottle is open at the top. The result is that the wine is more rapidly aerated inside the decanter, which causes a more rapid development and enhancement of the aromas and flavors of the wine, while also reducing bitterness and other undesirable flavors. The result of this wine "decanting" process is that it allows the wine to be consumed and flavorfully enjoyed in far less time after the bottle is opened and the wine is poured into a decanter as compared to merely pouring the wine from its original bottle into a wine glass.

When the decanter with the wine inside is subject to a specific movement (e.g., back-and-forth, swirling, etc.), the resulting turbulence in the flow of wine ends up facilitating and speeding up the aeration of the wine and the resultant rapid development and enhancement or improvement of the flavors and the different aromas or "bouquet" of the wine. That is, the moving decanter allows the wine to "breathe" the air and by doing so, it "opens up" the wine. This result is achieved through numerous chemical reactions involving the molecules of the various organic compounds comprising the wine—e.g., evaporation of less desirable volatile chemicals such as sulfites and ethanols, while leaving behind the more desirable aromatic and flavorful compounds. This is especially true if the inner surface of the decanter has various obstacles such as protrusions which the wine passes by or over as the decanter is moved. Compare this to the wine being in a relatively static or "closed" condition inside its original bottle with the cork removed, which results in little or no enhancement of the flavors and aromas, and which is due to only the upper surface of the wine in the bottle being exposed to air.

In general, decanting helps younger red wines to open up and quickly develop their aromas and flavors. However, older red wines and older white wines also benefit from decanting. Older, more delicate wines benefit more from slower movements of the decanter which are better for not disturbing the wine molecules. In contrast, younger wines benefit more from faster movements of the decanter. Also, older wines in their bottles tend to separate over time such that sediment in the wine gravitates toward the bottom of the bottle. The sediment comprises wine particles that typically have a bitter taste. The sediment may also comprise particles of the cork stopper. Thus, decanting older wines allows the sediment to remain in the bottle and not be within the wine as it is poured out of the bottle and into a decanter—usually in a slow, controlled manner. Also, the amount of time that the wine should remain in the decanter for decanting purposes and best aromas and flavors typically depends on various factors related to the wine itself (e.g., age of the wine, type of grapes) and the decanter such as its shape.

Wine decanters having various shapes, sizes and internal features have been utilized over the years. For example, decanters commonly have bases that are wider than that of the bottles the wines are stored and sold in, together with a narrower neck. The wide base allows the wine to pool over a large surface area and thus make better and more contact with air, while the narrow neck makes it easy for someone to pour the wine out of the decanter. Many of the known decanter designs are primarily for aesthetic purposes and less for utilitarian purposes. Also, most of these known decanter designs are intended to be moved solely by hand by a person. This can lead to problems in that it can be difficult for a person to repetitively move the decanter and the wine inside for adequate aeration purposes, which results in inconsistent and oftentimes inferior aroma and taste results associated with the wine inside the decanter. Such inconsistency in results may be a problem when handling relatively expensive and rare wines for which it is imperative to properly aerate and decant the wine.

Other known decanter designs are intended to be moved automatically by a mechanical device that interfaces with the decanter. These decanters and associated movement devices can result in more consistent and predictable results when aerating and decanting wines. However, these automatic devices tend to be of a relatively complex design and are expensive.

Also, various designs of wine glasses are known. Some wine glass designs have a stem attached to the bowl along with an associated bottom or base which rests on a table or other flat surface. Other wine glass designs are stemless and comprise solely the wine holding bowl. Most wine glasses have smooth inner surfaces—that is, the inner surfaces are devoid of any obstacles such as protrusions. Yet, it is well known and common for someone to swirl the glass to move the wine inside the glass for aeration purposes prior to drinking the wine.

Therefore, considering these and other problems with known, prior art wine decanters and wine glasses, what is needed are improved designs of a wine decanter and a wine glass that teach away from known, inadequate and inferior designs. Also needed is an improved design of a base that interfaces with a wine decanter or a wine glass, wherein the base is motorized and provides for automatic, repetitive, and predictable fluid movement of the wine inside of the decanter.

BRIEF SUMMARY OF THE INVENTION

An object of embodiments of the present invention is to provide a wine decanter having protrusions strategically located on an inner surface of the decanter which greatly expand the area of the decanter's inner surface that the wine is in contact with.

Another object of embodiments of the present invention is to provide a wine decanter having inner surface protrusions that more quickly develop and enhance the flavors and aromas of the wine.

Still another object of embodiments of the present invention is to provide a wine decanter that can be moved either manually by hand or automatically by a movable (e.g., motorized) base.

Yet another object of embodiments of the present invention is to provide a base for a wine decanter in which the base moves the decanter and the wine inside in a controlled manner.

Another object of embodiments of the present invention is to provide a base for moving the wine in a wine decanter to better aerate the wine inside the decanter.

Still another object of embodiments of the present invention is to provide a wine glass having inner protrusions which provide for similar benefits as compared to the wine decanter of embodiments of the present invention.

Yet another object of embodiments of the present invention is to provide a base having an upper surface which moves by way of a motor and holds a wine decanter or wine glass in a removably attachable manner.

Another object of the present invention is to provide a wine decanter that provides all of the aforementioned utility and functionality while also being aesthetically pleasing.

According to exemplary embodiments of the present invention, a wine decanter includes a reservoir that holds wine and a neck with an opening to allow wine to enter and exit the reservoir. The reservoir is generally rectangular with opposing front and rear sides and opposing left and right sides, and a substantially flat bottom. Protrusions are located on the reservoir inner surface at one of the front and rear sides or left and right sides. Each protrusion spans an entire length of one of the sides and protrudes into the reservoir thereby aerating the wine as it passes by the protrusions. All protrusions are located above the flat bottom of the reservoir such that none of the protrusions are located on the flat bottom of the reservoir, thereby allowing the wine to pool on the flat bottom of the reservoir. A base is provided that moves the decanter in a controlled back-and-forth motion to aerate the wine.

BRIEF DESCRIPTION OF THE DRAWINGS

The subject matter, which is regarded as the disclosure herein of exemplary embodiments of the present invention, is particularly pointed out and distinctly claimed in the claims at the conclusion of this specification. The forgoing and other features and advantages of the present invention will become more apparent from the following detailed description taken in conjunction with the accompanying drawings in which:

DETAILED DESCRIPTION OF THE INVENTION

Figure 2:
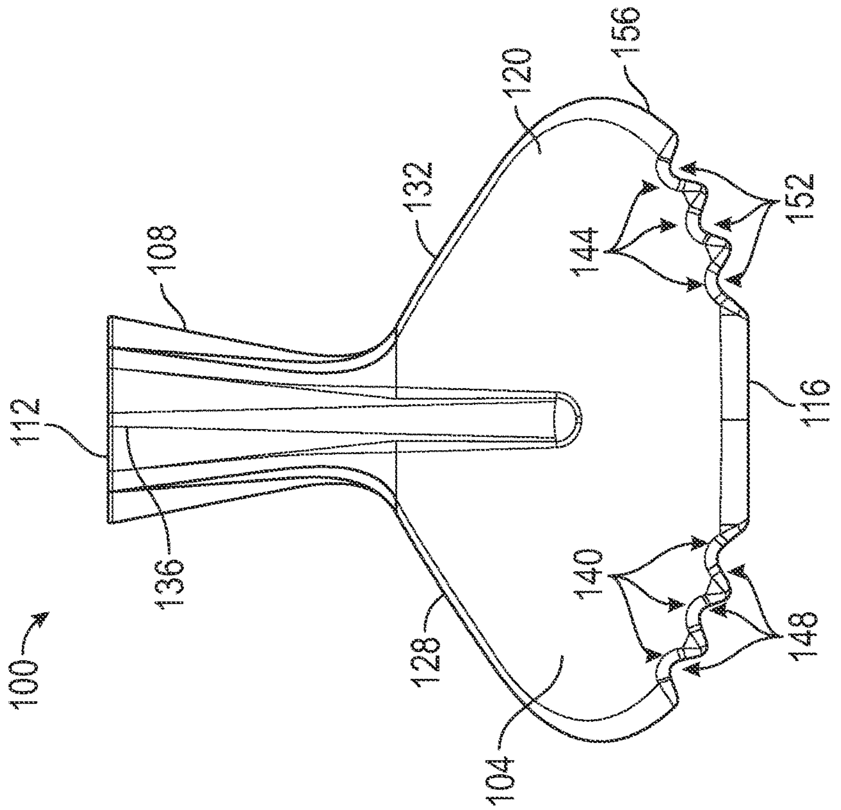
FIG. 2 is a front view of the wine decanter of FIG. 1, according to exemplary embodiments of the present invention.
Figure 1:
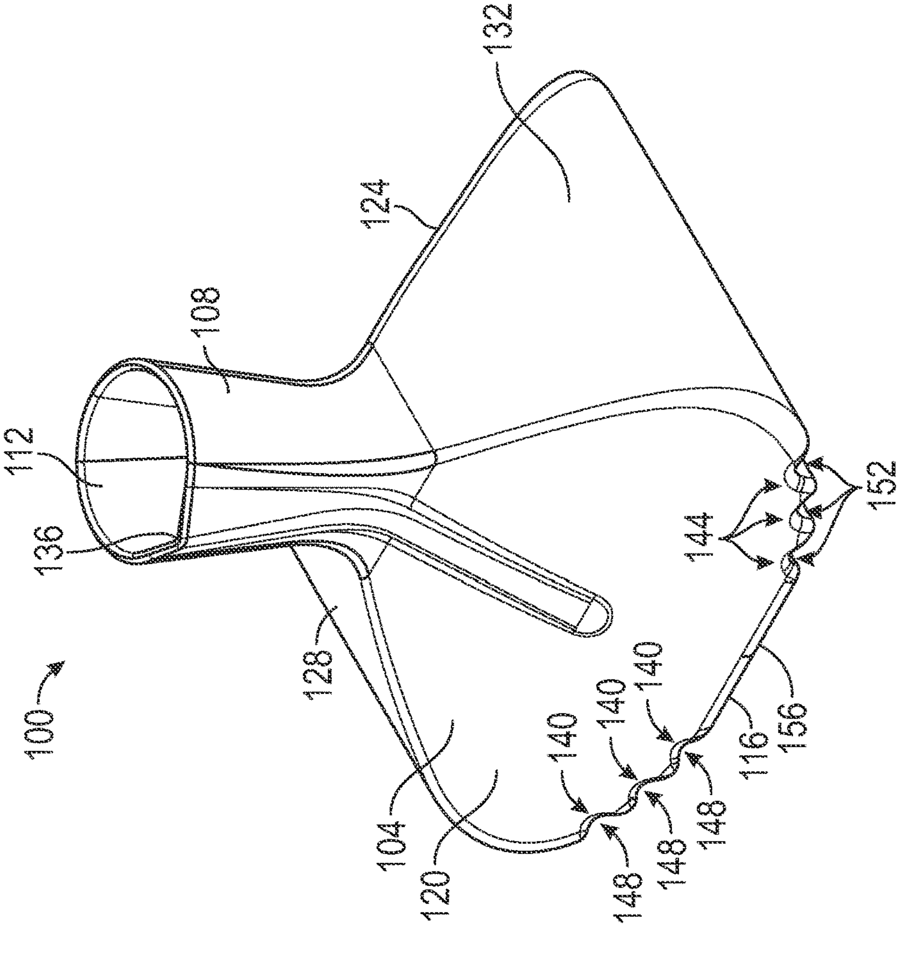
FIG. 1 is a perspective view of a wine decanter having protrusions on an inner surface for aerating wine, according to exemplary embodiments of the present invention.
Figure 4:
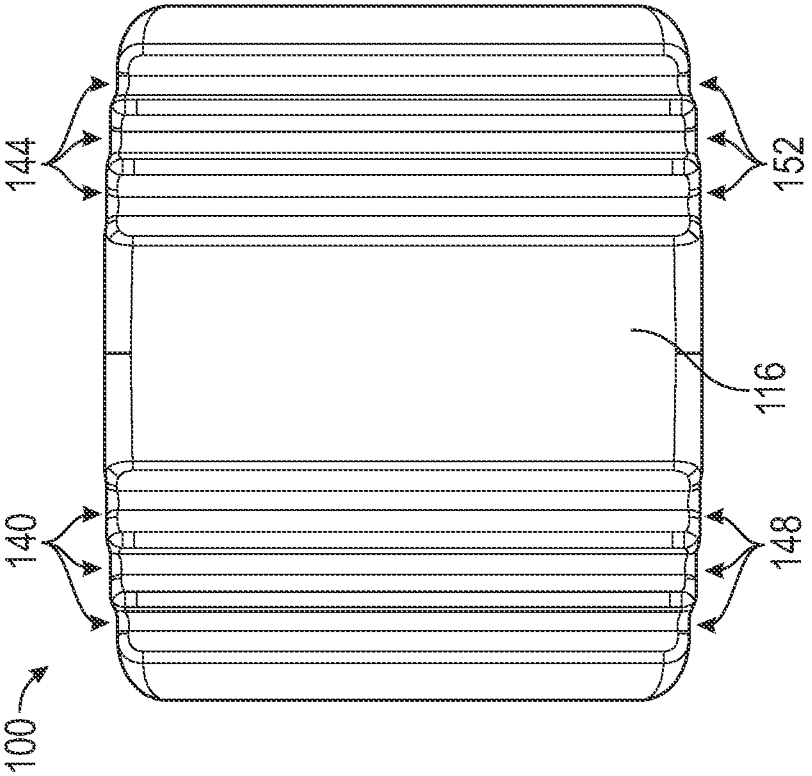
FIG. 4 is a bottom view of the wine decanter of FIG. 1, according to exemplary embodiments of the present invention.
Figure 3:
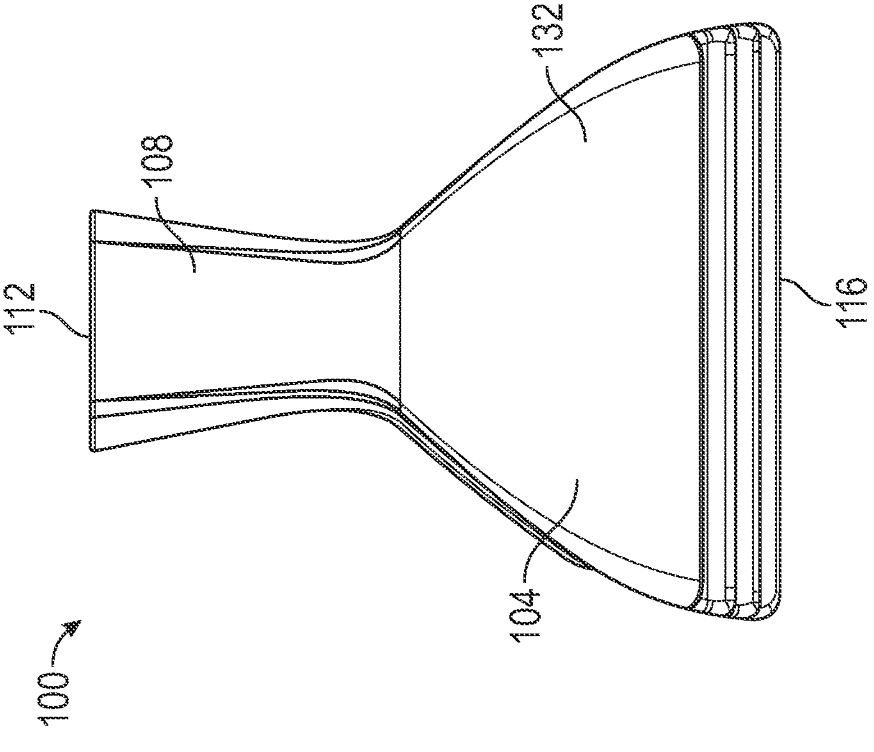
FIG. 3 is a side view of the wine decanter of FIG. 1, according to exemplary embodiments of the present invention.

It should be understood that throughout this patent application and specifically in the written description that follows and in the accompanying drawing figures, various directional and orientational terms such as horizontal, vertical, diagonal, up, down, upward, downward, in, out, inward, outward, forward, backward, sideways, front, rear, back, top, bottom, side, upper, lower, left, right, center, middle, above, below, and other similar directional and orientational terms as they are used herein refer to the wine decanter, wine glass, and motorized base of the various exemplary embodiments of the present invention as they are oriented when in typical use. All these terms are used in this written description and in the drawings for convenience only and as an aid to better understanding the exemplary embodiments of the present invention. These terms are not intended to be limiting in the claims or to imply that the wine decanter, wine glass, or motorized base must be used or positioned in any particular or specific direction or orientation while in use to satisfy the limitations of the claims.

Referring to FIGS. 1-4, there illustrated is a wine decanter 100 according to exemplary embodiments of the present invention. The wine decanter 100 includes a reservoir portion 104 and a narrower neck portion 108. The reservoir 104 holds the liquid wine, while the neck 108 has an opening 112 that enables someone to fill the reservoir 104 with wine and to also pour the wine out of the reservoir 104 and into a wine glass. The neck 108 may be of a diameter or overall size to allow someone to grasp and hold the decanter 100 easily and safely.

A bottom portion 116 of the decanter 100 has a substantially flat shape to allow to the decanter 100 to rest in a stable position on a table or other flat surface without fear of the decanter 100 tipping over and spilling the wine or the decanter 100 falling off the table. The flat bottom 116 also allows the wine inside to pool or puddle at the bottom of the decanter 100, which increases the surface area of the wine thereby facilitating the aeration of the wine, as discussed in detail hereinabove in the "BACKGROUND OF THE INVENTION" section. Also, the flat bottom 116 may be larger in size than the approximate three-inch diameter (e.g., 2⅞ inches to 3½ inches in diameter) of a typical 750 milliliter ("ml") bottle of wine.

According to exemplary embodiments, the decanter 100 has an overall generally rectangular shape. However, other suitable shapes for the decanter 100, such as an overall circular or oval shape, may be utilized in light of the teachings herein. The overall shape of the decanter 100 forms no part of the broadest scope of the present invention. Owing to its rectangular shape, the decanter 100, and in particular the reservoir 104, has a front side 120 and an opposing rear side 124, along with a left side 128 and an opposing right side 132. The front and rear sides 120, 124 are disposed at right angles to the left and right sides 128, 132. The front and rear sides 120, 124 are similar in shape and thus, appearance, while the left and right sides 128, 132 are similar in shape and thus, appearance.

The neck 108 may include a fluted spout 136 which starts at the opening 112 and transitions downward into a portion of the reservoir 104. The spout 136, which may be located at the front side 120 of the decanter 100, facilitates the controlled pouring of the wine out of the decanter 100. The reservoir 104 and the neck 108 may have various decorative features formed therein as desired.

According to exemplary embodiments, the decanter 100 has a number of protrusions 140, 144 formed or located on the inside of the decanter 100—specifically, on the inner surface of the reservoir 104. The protrusions 140 are located on the left side 128 of the reservoir 104, while the protrusions 144 are located on the right side 132 of the reservoir 104. The protrusions 140, 144 on each side 128, 132 may all be similar in structure and appearance to one another. In the alternative, the protrusions 140, 144 may differ from each other with respect to their size and/or shape. Further, the protrusions 140, 144 may be located instead on or in addition to the front and rear sides 120, 124, respectively, of the reservoir 104.

In the exemplary embodiments of FIGS. 1-4, each one of the protrusions 140, 144 spans or extends an entire length of the front side 120 of the reservoir 104 to the rear side 124 of the reservoir 104. Also, there are no protrusions 140, 144 located on the flat bottom surface 116 of the decanter 100. Instead, the protrusions 140, 144 are located on the inner surface of the reservoir 104 where the reservoir 104 starts to curve upwards and outwards from the bottom 116 on each of the left side 128 and the right side 132. This arrangement for the protrusions 140, 144 is such that the wine can pool on or at the flat bottom surface 116 of the decanter 100.

As best seen in FIG. 2, each protrusion 140, 144 has a generally round or hemispherical outer contour or shape, which results in an exemplary height of each protrusion 140, 144 of approximately one-half inch. The height of the protrusions 140, 144 is taken to mean the amount of distance that each protrusion 140, 144 sticks out into the reservoir 104 beyond the inner surface of the reservoir 104. This height value was chosen to allow for a "waterfall effect" when the wine is moved over the protrusions 140, 144, as described in greater detail hereinafter. Note, however, that the one-half inch height value is purely exemplary; the value chosen for the height of the protrusions 140, 144 can be other than one-half inch. Also, the selected value for the radius of curvature of each protrusion 140, 144 may depend primarily on the manufacturability of the decanter 100, which itself may depend on the type of material chosen for the decanter 100.

Also, it should be understood that the outer contour or shape of each protrusion 140, 144 may instead be rectangular, triangular, or any other shape that is suitable for flowing wine over the protrusions 140, 144, which increases the aeration of the wine. The specific shape of the protrusions 140, 144 is not a part of the broadest scope of the present invention.

In exemplary embodiments, there may be three protrusions 140, 144 located on each side 128, 132 of the reservoir 104. However, this number is purely exemplary. The number of protrusions 140, 144 may be other than three. The number of protrusions 140, 144 utilized on each side 128, 132 of the reservoir 104 may depend on the height and radius of each protrusion 140, 144 and the overall wine holding volume of the reservoir 104. That is, the decanter 100 is typically utilized to hold at least one standard 750 ml bottle of wine. As described in greater detail hereinafter, after a bottle of wine is poured into the decanter 100, the decanter 100 is moved either manually by hand or automatically by a moveable base 200 (FIGS. 5-6) to aerate the wine. Also, as described in greater detail hereinafter, the movement of the decanter 100 is preferably of a back-and-forth nature. As a result, the number of protrusions 140, 144, their location within the reservoir 104, and the height and radius of the protrusions 140, 144 depends largely on the ability of the protrusions 140, 144 to aerate the wine as the wine is moved over the protrusions 140, 144. The number of protrusions 140, 144 chosen may also be due in part to aesthetic design reasons for the decanter 100. Nevertheless, having multiple protrusions 140, 144 on the inner surface of the decanter 100 allows for a relatively more uniform movement of the wine inside the decanter 100.

The protrusions 140, 144 may be evenly distributed or spaced with respect to each other on the inner surface of the decanter 100. However, the protrusions 140, 144 may also be unevenly distributed or spaced with respect to each other on the inner surface of the decanter 100. Also, the protrusions 140, 144 are shown in FIG. 2 as being adjacent to each other and touching or in contact with one another. Note, however, that the protrusions 140, 144 may have some amount of spacing (e.g., a generally flat or somewhat curved surface) between one another. Further, the upper most protrusion 140, 144 on each side 128, 132 of the reservoir 104 may be located below the typical maximum fill level within the decanter 100 when the decanter 100 is filled with the liquid contents of a standard 750 ml size bottle of wine. This is to achieve the best amount of the "waterfall effect" when the wine is moved over the protrusions 140, 144.

As best seen in FIG. 2, each protrusion 140, 144 has a corresponding opposing depression 148, 152 formed in an outer surface 156 of the decanter 100. The depressions 148, 152, together with the flat bottom 116 of the decanter 100, comprise the contour or profile of the lower portion of the decanter 100. As described and illustrated in greater detail hereinafter, the depressions 148, 152 interface or mate with corresponding protrusions formed on an upper surface of a base 200. This facilitates the removable attachment of the decanter 100 with respect to the base 200.

The decanter 100 may be made or formed from, or comprise, a suitable glass material such as borosilicate. In the alternative, the decanter 100 may be made or formed from, or comprise, crystal or other suitable material. The material chosen for the decanter 100 should be one that is proper for interacting with wine and without causing any adverse effects to the wine. The protrusions 140, 144 may be formed integral with the glass or other material of the decanter 100 during the manufacture or formation of the decanter 100. In the alternative, the protrusions 140, 144 may be separate articles of manufacture that are attached or affixed to the inner surface of the decanter 100 using, e.g., an adhesive or some other suitable attachment method or material after the decanter 100 has been manufactured.

Figure 5:
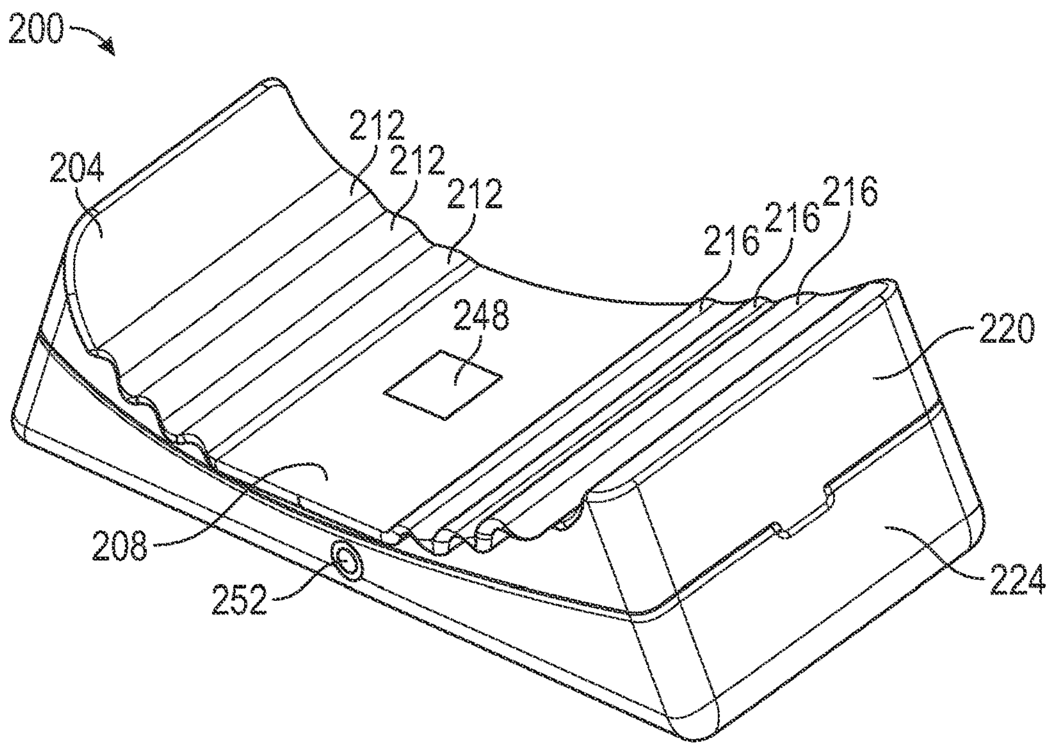
FIG. 5 is a perspective view of a base which interfaces with the wine decanter of FIGS. 1-4, according to exemplary embodiments of the present invention.
Figure 6:
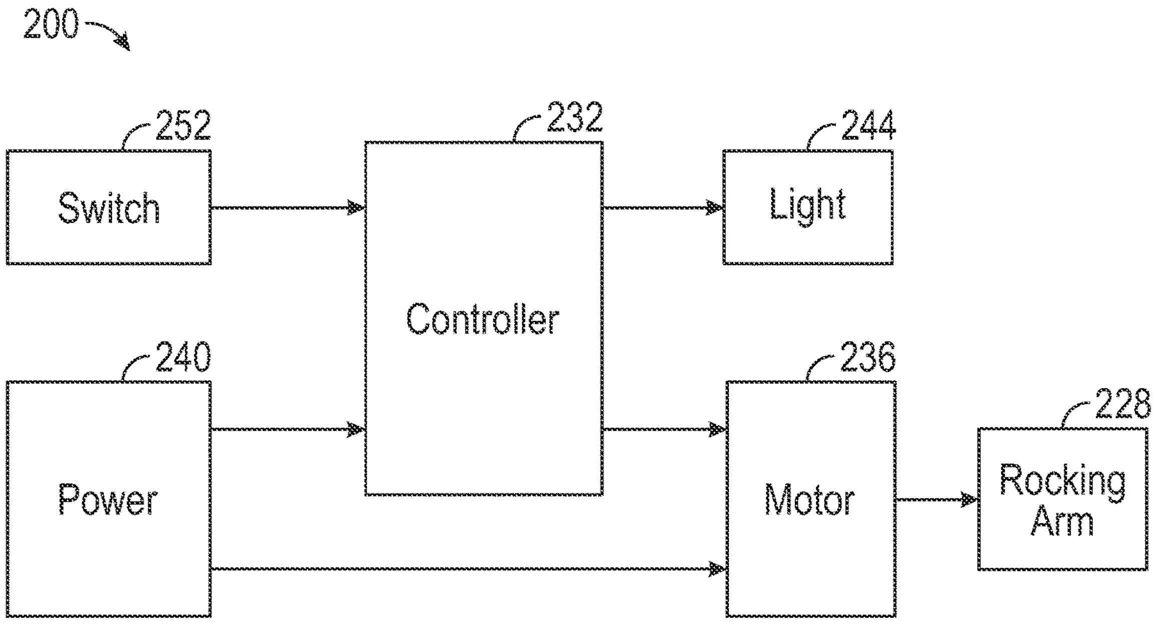
FIG. 6 is a block diagram of the various components of the base of FIG. 5, according to exemplary embodiments of the present invention.

Referring to FIG. 5, there illustrated is a base. 200 according to exemplary embodiments of the present invention. FIG. 6 is a block diagram illustration of the exemplary components of the base 200. The base 200 has a curved upper surface 204 with a contour or profile that is similar to the contour or profile of the outside lower portion of the decanter 100, as described hereinabove with respect to FIGS. 1-4. This configuration of the upper surface 204 allows for a secure interface and fit between the decanter 100 and the base 200, such that there is no slippage during the motion or movement of the base 200 with the decanter 100 removably attached thereto, as described and illustrated in greater detail hereinafter. To this end, the upper surface 204 of the base 200 may comprise a non-slip, high-friction material such as rubber. Alternatively, the upper surface 204 may include a non-slip coating onto the material comprising the upper surface 204.

Specifically, the upper surface 204 of the base 200 includes a central flat portion 208, which interfaces or mates with the flat bottom 116 of the decanter 100 when the decanter 100 is placed onto the upper surface 204. The upper surface 204 of the base 200 also includes two sets of protrusions 212, 216. The left side set of protrusions 212 comprises three protrusions which are intended to interface with the corresponding three left side depressions 148 in the bottom 116 of the decanter 100. Similarly, the right side set of protrusions 216 comprises three protrusions which are intended to interface with the corresponding three right side depressions 152 in the bottom 116 of the decanter 100.

In exemplary embodiments, the base 200 includes an upper assembly 220 and a lower assembly 224. The upper surface 204 of the base is integral with the upper assembly 220—both being intended to move. The lower assembly 224 is intended to be stationary and not move when it is placed on a surface such as the top of a table. A bottom portion of the lower assembly 224 may have a flat base with nub-like rubber or plastic feet for stability. The two assemblies 220, 224 may be connected together for movement of the upper assembly 220 by a mechanical rocking arm 228 located inside the base 200. Specifically, the rocking arm 228 allows for back-and-forth movement of the upper assembly 220 and its upper surface 204 with respect to the lower assembly 224.

Located inside the base 200 (e.g., in the lower assembly 224) may be an electronic controller 232 such as a microprocessor, which may be programmed to control the desired operation of the various components comprising the base 200. A motor 236 or similar driving means (e.g., a solenoid) located inside the base 200 may be provided to mechanically drive or move the rocking arm 228 and thus, the upper assembly 220. Power to the motor 236 may be provided by a power source 240 such as one or more DC batteries. In the alternative, the power source 240 may comprise typical AC electrical power. A light source 244 such as an LED may be located in the base 200 and may be used to shine light into the wine within the decanter 100 when the decanter 100 is positioned on the upper surface 204 of the base 200. The upper surface 204 of the base 200 may have an opening 248 in the flat portion of the upper surface 204 to allow light emitted from the light source 244 to pass into the decanter 100. The light emitted from the light source 244 may be utilized strictly for aesthetic purposes. The base 200 also includes a push button start switch or on/off switch 252.

Figure 8:
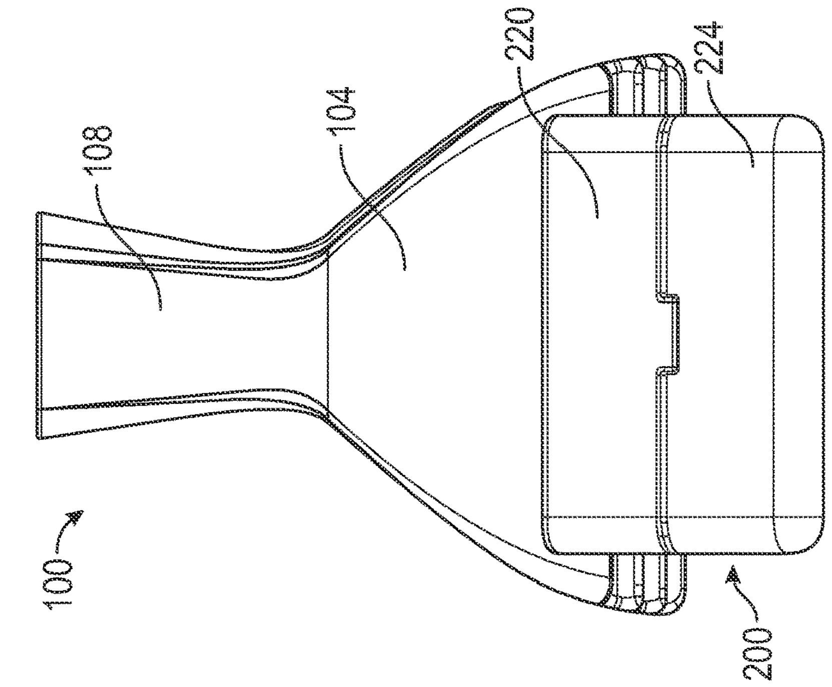
FIG. 8 is a side view of the wine decanter of FIGS. 1-4 interfaced with the base of FIGS. 5-6, according to exemplary embodiments of the present invention.
Figure 7:
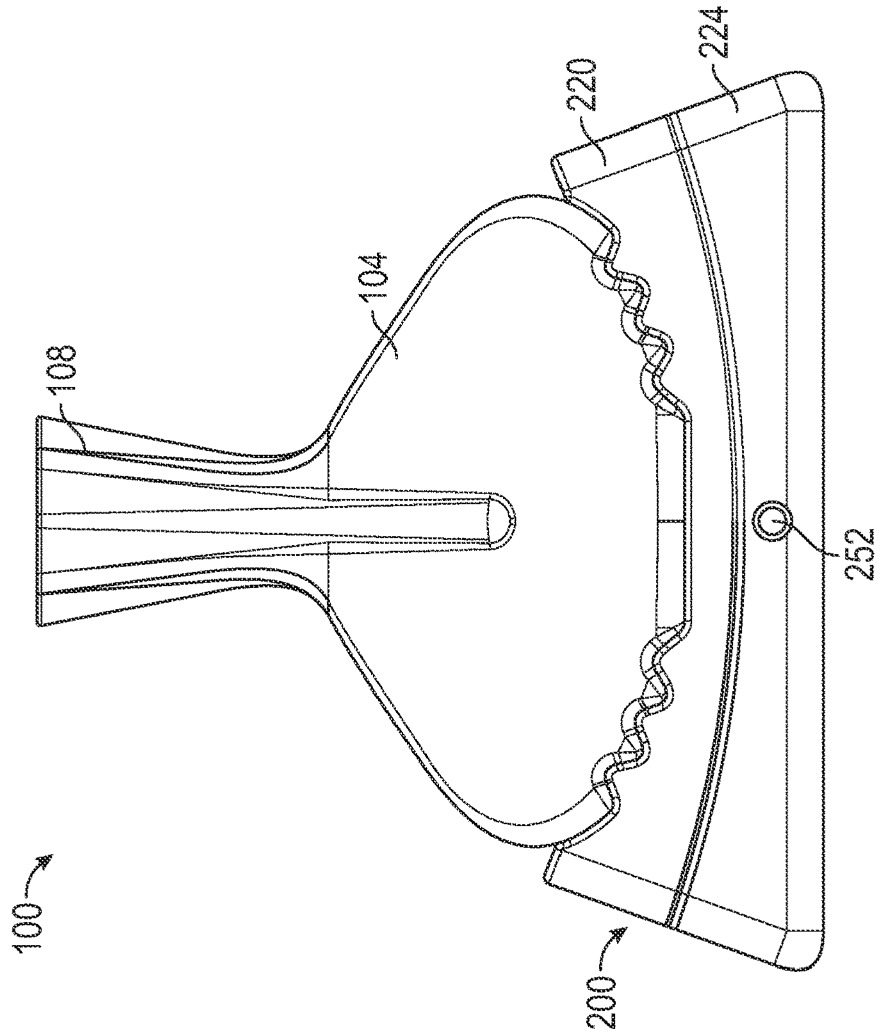
FIG. 7 is a front view of the wine decanter of FIGS. 1-4 interfaced with the base of FIGS. 5-6, according to exemplary embodiments of the present invention.
Figure 9:
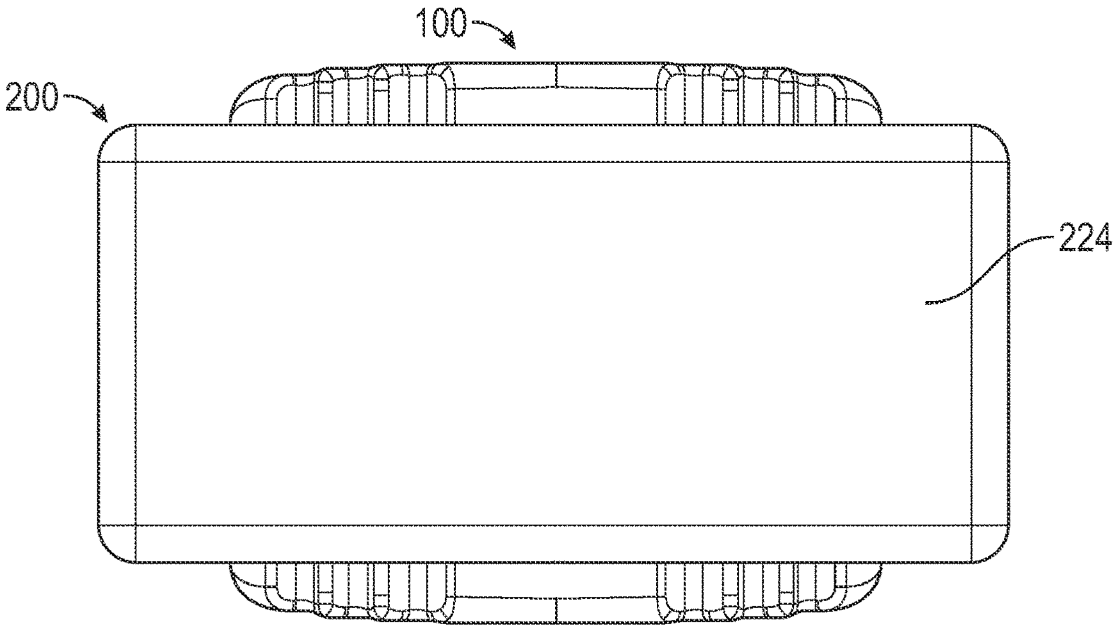
FIG. 9 is a bottom view of the wine decanter of FIGS. 1-4 interfaced with the base of FIGS. 5-6, according to exemplary embodiments of the present invention.

Referring to FIGS. 7-9, in operation the user places the decanter 100 having wine therein onto the upper surface 204 of the upper assembly 220 of the base 200. The user then activates the switch 252 to turn on the base 200 for movement of the upper assembly 220. In preferred exemplary embodiments, the upper assembly 220 together with its upper surface 204, moves or rocks back and forth (i.e., left to right, right to left, repeat, in FIG. 7) at a relatively slow pace. This back-and-forth movement of the upper assembly 220 and thus, the decanter 100 is preferred as compared to a swirling or circular movement, as the back-and-forth movement is better suited for properly aerating the wine inside the decanter 100. Also, this movement of the upper assembly 220 moves the decanter 100 and the wine inside, which aerates the wine as it flows over and past the protrusions 140, 144 within the decanter 100. The back-and-forth movement of the wine inside the decanter 100 thus provides for the "waterfall effect" of the wine, thereby properly aerating the wine. This movement of the upper assembly 220, while the lower assembly 224 remains stationary, allows for the base 200 to be considered a "movable base". Also, the combination of the decanter 100 and the base 200 comprises a system for decanting wine, such a system representing an improvement over known, prior art decanter and base configurations for decanting wine.

In an exemplary embodiment, the upper assembly 220 may be programmed to move for, e.g., three minutes, then stop automatically. This movement of the upper assembly 220 may be at a constant speed or rate. In the alternative, the speed or rate of movement of the upper assembly 220 may be made to vary. The speed or rate of movement of the upper assembly 220 can be changed as desired by the user through an appropriate command from the user to the controller 232. Also, the base 200 may be programmed to move the upper assembly 200 for other than three minutes. Further, there or may not be a pause when the upper assembly 220 reaches the end of movement in one direction before the upper assembly 220 begins its movement in the opposite direction. The amount of time of this pause may be programmed into the controller 232. In general, the amount of time that the upper assembly 220 moves, along with the speed or rate of movement of the upper assembly 220, and any other characteristic of the movement of the upper assembly 220, may depend on characteristics of the wine inside the decanter 100, such as the type of wine (red, white) and the age of the wine.

As is known, movement of the decanter 100 by hand results in unpredictable and non-repetitive movement of the wine inside. This leads to inferior aeration of the wine inside the decanter 100. Instead, movement of the decanter 100 by the movable base 200 of embodiments of the present invention results in a relatively more uniform movement of the wine inside the decanter 100, which leads to better and more effective aeration of the wine.

Figure 10:
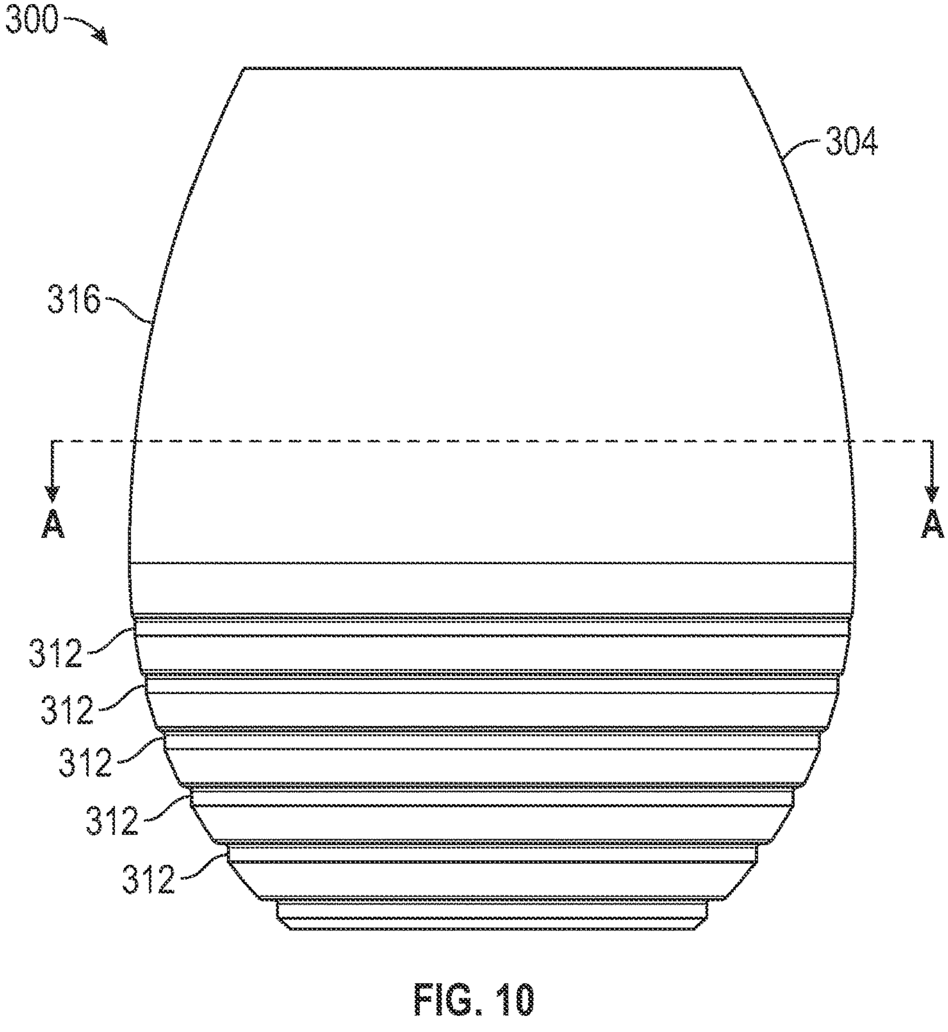
FIG. 10 is a front view of a wine glass having protrusions on an inner surface, according to other exemplary embodiments of the present invention.
Figure 11:
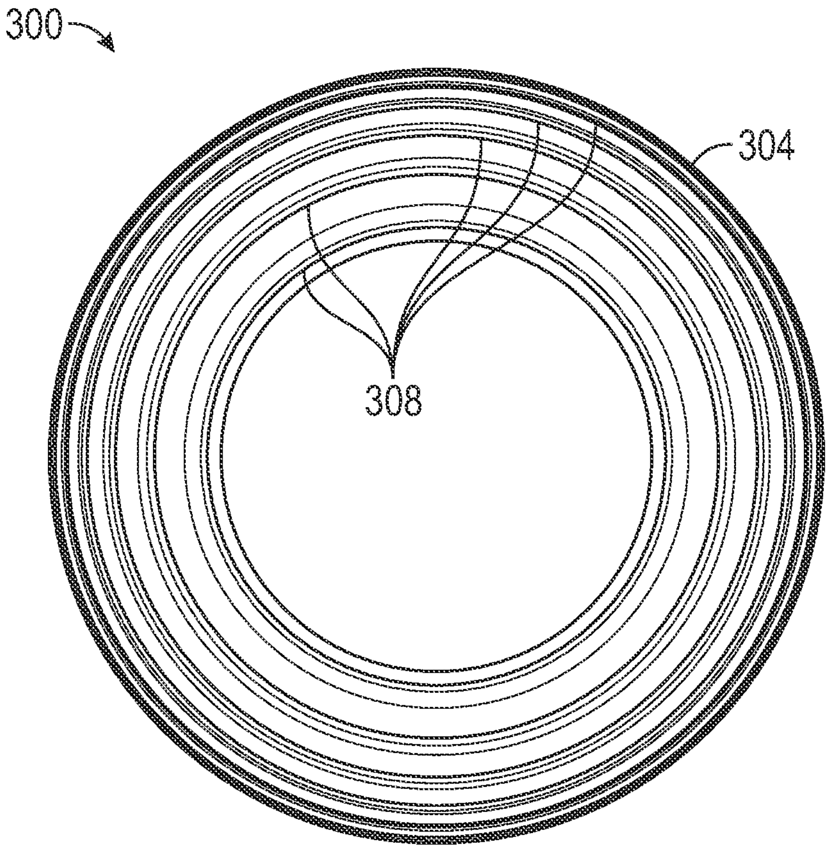
FIG. 11 is a cutaway top view of the wine glass of FIG. 10 taken along the lines A-A of FIG. 10, according to other exemplary embodiments of the present invention.

Referring to FIGS. 10-11, there illustrated is a wine glass 300 according to other, additional exemplary embodiments of the present invention. The wine glass 300 has a bowl or reservoir 304 having a defined volume for holding wine. The bowl 304 may have a tapered outer surface, as illustrated in FIG. 10. In embodiments, the wine glass 300 does not have a stem; thus, the wine glass 300 is "stemless." In alternative embodiments, the wine glass 300 may have a stem (not shown) located underneath the bowl 304 and attached thereto. The other end of the stem may terminate in a base portion which sits on a table or other flat surface. The material of the wine glass 300 may comprise glass, ceramic, plastic, aluminum, other metals, or other suitable material.

Similar to the decanter 100 of FIGS. 1-4, the wine glass 300 of FIGS. 10-11 may have a plurality of protrusions 308 formed on an inner surface of the bowl 304 of the wine glass 300. In exemplary embodiments, there are five protrusions 308 on the inner surface of the bowl 304. However, the broadest scope of the present invention is not limited to five protrusions 308. Any number of protrusions 308 may be utilized. Also, the protrusions 308 may encircle the entire inner perimeter of the bowl 304. As such the protrusions 308 may be arranged concentrically, as best seen in FIG. 10. Further, the protrusions 308 may all be of the same size and shape; for example, a generally round or hemispherical outer contour or shape similar to that of the protrusions 140, 144 of the decanter 100, as described and illustrated hereinabove. In the alternative, the protrusions 308 may be of differing sizes and/or shapes.

Also, the location of the upper most protrusion 308 inside the wine glass 300 may be below a typical maximum fill level of wine within the glass (e.g., 6 ounces or 9 ounces). This location of the upper most protrusions 308 assists with the proper aeration of the wine in the glass 300. In addition, there may be five depressions 316 formed in the outer surface of the glass. Similar to the decanter 100 of FIGS. 1-4, these depressions 316 are located opposite to the corresponding protrusions 308 inside the glass 300.

In exemplary embodiments, having multiple protrusions 308 allows for the achievement of a relatively more uniform movement of the wine inside of the glass 300. This is particularly true since the wine glass 300 will most often be moved manually by a person when they are testing the aromas and flavors of the wine, and not by a device such as the base 200. The protrusions 308 thus allow for the achievement of the "waterfall effect" (i.e., rapid and proper aeration of the wine inside the glass 300), much like the decanter 100 described and illustrated hereinabove.

In the exemplary embodiments of the present invention described and illustrated hereinabove, the base 200 is used together with the wine decanter 100. However, in other exemplary embodiments, the base 200 may be used instead together with the wine glass 300. That is, the wine glass 300 and/or the base 200 may be adapted structurally such that the glass 300 is disposed on the upper surface 204 of the base 200 and is held in that position while the base 200 and its upper assembly 220 are operated to impart motion to the glass 300 and the wine inside. This way, the wine in the glass 300 is aerated in much the same manner as previously described in connection with the wine in the decanter 100 as it operates with the base 200. Any such structural adaptations to the base 200 and/or the wine glass 300 should be apparent to one of ordinary skill in the art in light of the teachings herein.

Also, the exemplary embodiments of the decanter 100, base 200, and wine glass 300 have been described and illustrated herein for use with wine. However, the broadest scope of the present invention is not to be construed to be limited as such. Instead, the decanter 100, base 200, and glass 300 may be used for mixing or blending together the ingredients of various popular alcoholic or non-alcoholic drinks other than wine. These may include, for example and without limitation, sangria, mojitos, or other vodka, gin, rum, or whisky-based mixed drinks. For example, the various individual ingredients that comprise a mixed drink may be poured into the decanter 100 in appropriate amounts while the decanter 100 is either removably attached to the base 200 or is separate from the base 200. The base 200 with the decanter 100 attached thereto may then be operated as described hereinabove to move the decanter 100 in the back-and-forth manner, thereby mixing or blending together the various ingredients. The user may program the controller 232 to adjust variables in the mixing process such as overall time of movement of the upper assembly 220 and speed or rate of movement of the upper assembly 220. A similar procedure may be followed if the glass 300 has been adapted to be removably attached to the base 200.

In light of the foregoing, the wine decanter 100, base 200, and wine glass 300 of the exemplary embodiments of the present invention described and illustrated herein have numerous significant advantages as compared to known, prior art wine decanters, wine glasses, and movable bases.

The terminology used herein is for the sole purpose of only describing particular exemplary embodiments of the present invention and is not intended to be limiting of the present invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, steps, operations, elements, parts and/or components, but do not preclude the presence or addition of one or more features, steps, operations, elements, parts, components and/or groups thereof other than those explicitly described and illustrated herein.

While the invention is provided in detail in connection with only a limited number of exemplary embodiments, it should be readily understood that the invention is not limited to such disclosed embodiments. Rather, the invention can be modified to incorporate any number of variations, alterations, substitutions, or equivalent arrangements not heretofore described, but which are nevertheless commensurate with the spirit and scope of the invention. Additionally, while various exemplary embodiments of the invention have been described, it is to be understood that these exemplary embodiments may include only some of the described exemplary aspects. Accordingly, the invention is not to be seen as limited by the foregoing description but is only to be limited by the scope of the claims appended hereto.

The invention claimed is:

1. A decanter, comprising:

a reservoir portion configured to hold a predetermined amount of a liquid; and a neck portion located above the reservoir portion, the neck portion having an opening configured to allow the liquid to enter and exit the reservoir portion, a fluted spout located at the neck portion and extending downward into at least a portion of the reservoir portion;

wherein the reservoir portion is of a generally rectangular shape having opposing front and rear sides and opposing left and right sides, the reservoir portion having a substantially flat bottom;

wherein the reservoir portion includes a plurality of protrusions located on an inner surface of the reservoir portion at one of the front and rear sides of the reservoir portion or the left and right sides of the reservoir portion;

wherein each one of the protrusions spans an entire length of one of the front and rear sides of the reservoir portion or the left and right sides of the reservoir portion;

wherein each one of the protrusions has an outer shape and wherein each of the protrusions protrudes into the reservoir portion by a predetermined amount thereby aerating the liquid as it passes by each of the protrusions; and wherein all of the protrusions are located above the flat bottom of the reservoir such that none of the protrusions are located on the flat bottom of the reservoir, whereby locating none of the protrusions on the flat bottom of the reservoir allows the liquid to pool on the flat bottom of the reservoir.

2. The decanter of claim 1, wherein the outer shape of each one of the protrusions comprises one of a hemispherical, round, rectangular, or triangular shape.

3. The decanter of claim 1, wherein all of the protrusions that are located at any one of the front side of the reservoir portion, the rear side of the reservoir portion, the left side of the reservoir portion, or the right side of the reservoir portion are adjacent to one another and in contact with one another.

4. The decanter of claim 1, wherein all of the protrusions that are located at any one of the front side of the reservoir portion, the rear side of the reservoir portion, the left side of the reservoir portion, or the right side of the reservoir portion are adjacent to one another and spaced apart from one another.

5. The decanter of claim 1, wherein the protrusions are formed integral with the inner surface of the reservoir portion or are formed separately from the reservoir portion and are affixed to the inner surface of the reservoir portion.

6. The decanter of claim 1, wherein each of the protrusions has an opposing depression formed in an outer surface of the reservoir portion.

7. The decanter of claim 1, wherein the decanter comprises a material that is selected from the group comprising borosilicate glass and crystal.

8. The decanter of claim 1, wherein the opening of the neck portion is smaller in total dimension than an outer dimension of the reservoir portion.

9. A system for decanting wine, comprising:

a decanter; and a base;

wherein the decanter comprises:

a reservoir portion configured to hold a predetermined amount of wine; and a neck portion located above the reservoir portion, the neck portion having an opening configured to allow the wine to enter and exit the reservoir portion;

wherein the reservoir portion is of a generally rectangular shape having opposing front and rear sides and opposing left and right sides, the reservoir portion having a substantially flat bottom;

wherein the reservoir portion includes a plurality of protrusions located on an inner surface of the reservoir portion at one of the front and rear sides of the reservoir portion or the left and right sides of the reservoir portion;

wherein each one of the reservoir protrusions has an outer shape and wherein each of the reservoir protrusions protrudes into the reservoir portion by a predetermined amount thereby aerating the wine as it passes by each of the reservoir protrusions;

wherein each of the reservoir protrusions has an opposing depression located in an outer surface of the reservoir portion;

wherein the base comprises:

an upper assembly and a lower assembly, the lower assembly being stationary, the upper assembly being movable with respect to the lower assembly;

means for moving the upper assembly with respect to the lower assembly;

wherein the upper assembly comprises an upper surface having a plurality of protrusions, each of the upper surface protrusions removably attaching with the corresponding one of the reservoir depressions;

wherein when the decanter is removably attached to the base, the base is operable to move the decanter thereby aerating the wine inside the decanter.

10. The system of claim 9, wherein the means for moving the upper assembly with respect to the lower assembly comprises a motor.

11. The system of claim 9, wherein the base further comprises a controller configured to control movement of the upper assembly with respect to the lower assembly.

12. The system of claim 9, wherein when the decanter is removably attached to the base, the base is operable to move the decanter in a back-and-forth manner.

13. The system of claim 9, wherein the upper surface of the upper assembly further comprises a flat bottom section disposed between a first section of the upper surface protrusions and a second section of the upper surface protrusions.

14. The system of claim 13, wherein the flat bottom section of the upper surface is configured to removably attach with the flat bottom of the reservoir portion of the decanter.

15. The system of claim 9, wherein the base further comprises a light source for emitting light into the decanter when the decanter is removably attached to the base.

16. The system of claim 9, wherein each one of the reservoir protrusions spans an entire length of one of the front and rear sides of the reservoir portion or the left and right sides of the reservoir portion.

17. The system of claim 9, wherein all of the reservoir protrusions in the reservoir are located above the flat bottom of the reservoir such that none of the reservoir protrusions are located on the flat bottom of the reservoir, whereby locating none of the reservoir protrusions on the flat bottom of the reservoir allows the wine to pool on the flat bottom of the reservoir.

* * * * *